(12) United States Patent
Abe et al.

(10) Patent No.: US 8,551,370 B2
(45) Date of Patent: *Oct. 8, 2013

(54) OXIDE SINTERED BODY, MANUFACTURING METHOD THEREFOR, MANUFACTURING METHOD FOR TRANSPARENT CONDUCTIVE FILM USING THE SAME, AND RESULTANT TRANSPARENT CONDUCTIVE FILM

(75) Inventors: Yoshiyuki Abe, Ichikawa (JP); Tokuyuki Nakayama, Ichikawa (JP); Go Ohara, Ome (JP); Riichiro Wake, Ome (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/613,595

(22) Filed: Sep. 13, 2012

(65) Prior Publication Data
US 2013/0001080 A1 Jan. 3, 2013

Related U.S. Application Data

(62) Division of application No. 13/067,261, filed on May 19, 2011, now Pat. No. 8,349,220, which is a division of application No. 11/716,673, filed on Mar. 12, 2007, now Pat. No. 7,976,738.

(30) Foreign Application Priority Data

Mar. 15, 2006 (JP) .................................. 2006-070069
Feb. 6, 2007 (JP) .................................. 2007-026580

(51) Int. Cl.
*H01B 1/08* (2006.01)

(52) U.S. Cl.
USPC ................................... 252/519.51; 252/520.1

(58) Field of Classification Search
USPC ...................... 252/519.51, 520.1; 204/192.15
See application file for complete search history.

(56) References Cited

U.S. PATENT DOCUMENTS

| 4,716,086 A | 12/1987 | Gillery et al. |
| 6,534,183 B1 | 3/2003 | Inoue |

(Continued)

FOREIGN PATENT DOCUMENTS

| CN | 1369572 A | 9/2002 |
| JP | 2-145458 | 6/1990 |

(Continued)

OTHER PUBLICATIONS

"Transparent conductive film technology," *Japan Society for the Promotion of Science*; Ohmsha, Ltd., 1999, pp. 125 and 173, including cover sheet, table of contents and end sheet (6 Sheets total).

(Continued)

*Primary Examiner* — Mark Kopec
(74) *Attorney, Agent, or Firm* — Kratz, Quintos & Hanson, LLP

(57) ABSTRACT

An oxide sintered body substantially containing zinc, tin and oxygen; containing tin at an atomic number ratio, Sn/(Zn+Sn), of 0.23 to 0.50, and being composed mainly of a zinc oxide phase and at least one kind of zinc stannate compound phase, or being composed of at least one kind of zinc stannate compound phase; provided by a method for manufacturing the oxide sintered body by formulating an aqueous solvent to raw material powder containing powder of a zinc stannate compound, or mixed powder of tin oxide powder and zinc oxide powder, and after mixing the resulting slurry for equal to longer than 15 hours, by subjecting the slurry to solid-liquid separation, drying and granulation and subsequently compacting by charging the granule into a mold followed by sintering the resultant compact under sintering atmosphere at 1300 to 1500° C. for equal to or longer than 15 hours.

1 Claim, 1 Drawing Sheet

(56) References Cited

U.S. PATENT DOCUMENTS

| | | |
|---|---|---|
| 6,669,830 B1 | 12/2003 | Inoue et al. |
| 6,899,953 B1 | 5/2005 | O'Shaughnessy et al. |
| 2003/0148871 A1* | 8/2003 | Inoue .............................. 501/134 |
| 2009/0308635 A1 | 12/2009 | Yano et al. |
| 2010/0170696 A1 | 7/2010 | Yano et al. |

FOREIGN PATENT DOCUMENTS

| | | |
|---|---|---|
| JP | 2-149459 | 6/1990 |
| JP | 8-171824 | 7/1996 |
| JP | 08-171824 A | 7/1996 |
| JP | 2000-207935 | 7/2000 |
| JP | 2000-256061 | 9/2000 |
| JP | 2005-154820 | 6/2005 |
| JP | 2006-169200 | 7/2006 |
| JP | 2006-194926 | 7/2006 |
| JP | 2006-196201 | 7/2006 |
| JP | 2007-031786 | 2/2007 |
| JP | 2007-314364 | 12/2007 |

OTHER PUBLICATIONS

H. Enoki et al., "The Electrical and Optical Properties of the ZnO—$SnO_2$ Thin Films Prepared by RF Magnetron Sputtering", *Phys. Stat. Sol.* (a) 129, 181 (1992). p. 181, XP009036246.

Abboudy et al., "Influence of substrate temperature on the electrical behaviour of zinc stannate thin films...", *Il Nuovo Cimento 20D*, No. 12, Dec. 1998, 1881-90.

Al-Shahrani et al., "Absence of the Coulomb gap at the Femi level in the variable range hopping regime of zinc stannate polycrystalline systems", *J Phys D: Appl Phys 29*, (1996), 2165-69.

Minami, T., "Transparent and conductive multicomponent oxide films prepared by magnetron sputtering.", *J. Vac. Sci. Technol. A.*, 17(4), Jul./Aug. 1999, pp. 1765-1772.

Zang, G. et al., "New $ZnSnO_3$-based varistor system", *Journal of Materials Science*, 39 (2004), pp. 3537-3539.

Minami, T. et al., "Highly Transparent and Conductive Zinc-Stannate Thin Films...", *Jpn. J. Appl. Phys.*, vol. 33 (1994), pp. L 1693-1696.

European Search Report dated Nov. 4, 2010.

Japanese Office Action dated Oct. 27, 2009.

* cited by examiner

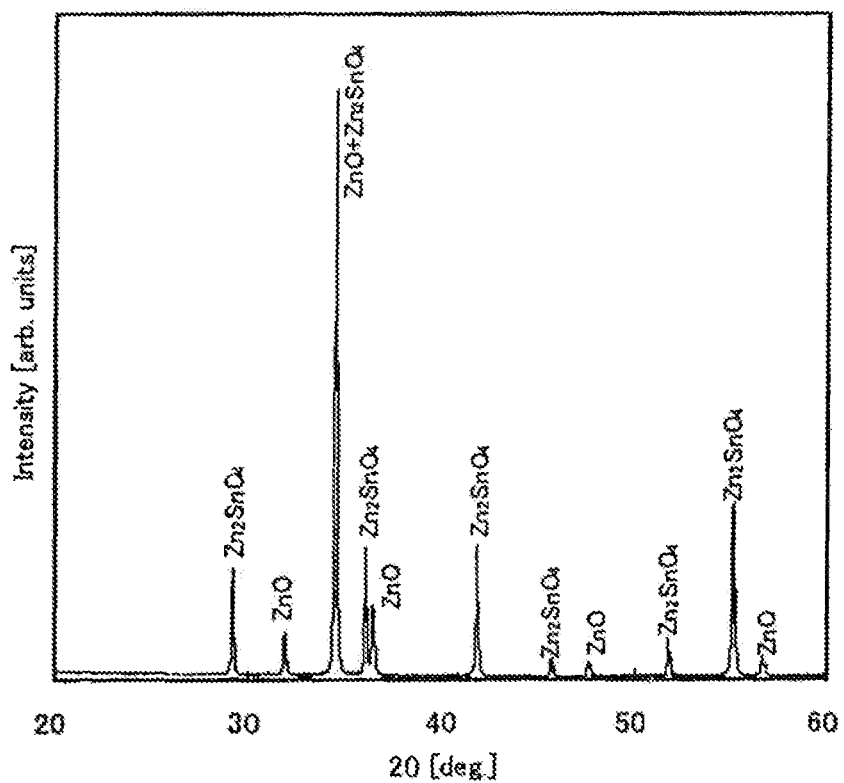

OXIDE SINTERED BODY, MANUFACTURING METHOD THEREFOR, MANUFACTURING METHOD FOR TRANSPARENT CONDUCTIVE FILM USING THE SAME, AND RESULTANT TRANSPARENT CONDUCTIVE FILM

This is a Divisional application of U.S. patent application Ser. No. 13/067,261, filed on May 19, 2011, now U.S. Pat. No. 8,,349,220, which is a Divisional Application of U.S. patent application Ser. No. 11/716,673, filed on Mar. 12, 2007, now U.S. Pat. No. 7,976,738, which is hereby incorporated by reference.

BACKGROUND OF THE INVENTION

1. Field of the Invention

The present invention relates to the oxide sintered body, a manufacturing method therefor, a manufacturing method for transparent conductive film using the same, and the resultant transparent conductive film, and more specifically the present invention relates to the oxide sintered body substantially containing zinc, tin and oxygen, useful as a target, which can be sputtered under charging of high DC power, and a manufacturing method for an oxide transparent conductive film formable in high-speed, and the oxide transparent conductive film excellent in chemical resistance.

2. Description of the Prior Art

A transparent conductive film is widely used not only as electrodes of solar batteries or liquid crystalline display elements and other various light-sensitive elements, but also as heat reflecting films for automotive windows or construction applications, antistatic films, or antifogging transparent heat generators such as for freezer show cases, because of having high conductivity and high transmittance in the visible light range.

As such transparent conductive films, for example, a tin oxide ($SnO_2$)-based thin film, a zinc oxide (ZnO)-based thin film, and an indium oxide ($In_2O_3$)-based thin film are known.

As a tin oxide-based transparent conductive film, one containing antimony as a dopant (ATO) or one containing fluorine as a dopant (PTO) is well utilized. In addition, as a zinc oxide-based transparent conductive film, one containing aluminum as a dopant (AZO) or one containing gallium as a dopant (GZO) is well utilized. The most industrially utilized transparent conductive films are indium oxide-based ones; among them, indium oxide which contains tin as a dopant is called ITO (indium tin oxide), which is widely used, because a transparent conductive film particularly having low resistance can easily be obtained.

Transparent conductive films having low resistance are suitably used as solar batteries, liquid crystals, surface elements for organic electro luminescence and inorganic electro luminescence, or touch panels and the like.

As a method for manufacturing these transparent conductive films, a sputtering method or an ion plating method is well utilized. In particular, a sputtering method is an effective method for film formation of a material with low vapor pressure, or in the case where precise control of film thickness is required, and widely utilized industrially because of extremely simple and convenient operation.

A sputtering method uses a target as a raw material of a thin film. The target is a solid containing metal elements configuring a thin film to be formed, and a sintered body of such as a metal, a metal oxide, a metal nitride, and a metal carbide, and in some cases, single crystals are used. A sputtering method, in general, uses an apparatus having a vacuum chamber which is capable of arranging a substrate and the target therein. Gas pressure inside the vacuum chamber is controlled to equal to or lower than about 10 Pa, by once making to high vacuum after arrangement of the substrate and the target, followed by introduction of rare gas such as argon or the like. Argon plasma is generated by glow discharge between the substrate as an anode and the target as a cathode, subsequently argon cations in the plasma are made to collide with the target as the cathode, and target component particles flicked thereby are deposited on the substrate to form a film.

A sputtering method is classified by a generation method for argon plasma; one using high frequency plasma is called a high frequency sputtering method, and one using DC plasma is called a DC sputtering method.

In general, a DC sputtering method is widely used industrially, because high-speed film formation is provided, a power unit is cheaper and film formation operation is simpler and more convenient, as compared with a high frequency sputtering method. In addition, a DC sputtering method requires use of a conductive target, while a high frequency sputtering method is capable of forming a film using also an insulating target.

Film formation speed in sputtering is in close relation with a chemical bond of a target substance. Sputtering is a phenomenon where argon cations having kinetic energy are collided with the target surface, and substances at the target surface are flicked by receiving the energy, therefore, a weaker ionic or atomic bond of the target substance provides higher probability of being flicked by sputtering.

To form a transparent conductive film of an oxide such as ITO by sputtering, the following 2 methods are included; a reactive sputtering method for forming a film in a mixed gas of argon and oxygen, by using an alloy target of metals configuring the film (In—Sn alloy for an ITO film); and a reactive sputtering method for forming a film in a mixed gas of argon and oxygen by using the oxide sintered body made of oxides of metals configuring the film (In—Sn—O sintered body for an ITO film).

A method using an alloy target requires increased oxygen gas flow, because all oxygen in the resultant transparent conductive film is fed from oxygen gas in atmosphere; resulting in difficulty in maintaining small variation of oxygen gas amount in atmosphere gas. This method makes difficult to manufacture a transparent conductive film having consistent thickness and consistent characteristics, because film formation speed or characteristics (resistivity and transmittance) of the resultant film extremely largely depends on oxygen gas amount introduced into the atmosphere (see "Transparent conductive film technology", Japan Society for the Promotion of Science, published by Oshma, Ltd., page 173, published in 1999).

On the other hand, a method using an oxide target is capable of reducing variation of oxygen gas amount in the atmosphere gas as compared with using an alloy target, because a part of oxygen supplied to the film is supplied from the target itself, and only deficient oxygen amount is supplied as oxygen gas; resulting in easier manufacturing of the transparent conductive film having consistent thickness and consistent characteristics as compared with using the alloy target. Therefore, a method for using the oxide sintered body as a target is widely adopted industrially.

In the same way as for a tablet for an ion plating method, use of a tablet made of the oxide sintered body is capable of manufacturing a transparent conductive film having consistent thickness and characteristics.

As described above, in consideration of productivity or manufacturing cost, a DC sputtering method is easier in high-speed film formation than a high frequency sputtering method; namely, a DC sputtering method provides about 2 to 3 times higher-speed film formation when compared by charging the same power to the same target. In addition, charging of high DC power is preferable to enhance productivity, because charging of higher DC power provides higher-speed film formation, even in a DC sputtering method. Therefore, such a sputtering target is industrially useful that is capable of stable film formation without generation of sputtering abnormality, even by charging high DC power.

By the way, an indium oxide-based material such as ITO or the like is widely used to obtain a transparent conductive film as described above, however, a non-indium-based material is required, because an indium metal is a rare metal on the earth, and it has toxicity and affects badly to environment or a human body. As the non-indium-based material, a zinc oxide-based material such as GZO or AZO, and a tin-oxide-based material such as FTO or ATO are known. A transparent conductive film made of a zinc oxide-based material is industrially manufactured by a sputtering method, however, it has a defect of poor chemical resistance (alkali resistance and acid resistance). In addition, a transparent conductive film made of a tin oxide-based material, although excellent in chemical resistance, has defect of difficulty in manufacturing by a sputtering method, because of difficulty in manufacturing a tin oxide-based sintered body target having high density and durability.

As a substance for solving such defect, a Zn—Sn—O-based transparent conductive film has been proposed. This Zn—Sn—O-based transparent conductive film is a material excellent in chemical resistance, which has overcome defect of a zinc oxide-based transparent conductive film. To obtain this Zn—Sn—O-based transparent conductive film, for example, a method for film formation by high frequency sputtering using mixed powder of sintered ZnO and SnO, as a target, has been proposed (see JP-A-8-171824). The resultant transparent conductive film by this method is a crystalline thin film having a $Zn_2SnO_4$ compound and a $ZnSnO_3$ compound as main components; and is a thin film with improved chemical resistance, which is defect of a ZnO-based transparent conductive film. However, because the film is formed by high frequency sputtering using a powder-like target, such a target is not capable of obtaining an excellent transparent conductive film in a DC sputtering method.

In addition, such a film has been proposed that has structure laminated with a transparent film of mixed oxides of zinc and tin, and a reflecting film made of chromium nitride, on a substrate, one on top of the other (see JP-A-2-145458). However, this transparent film of mixed oxides of zinc and tin is formed by a reactive sputtering method using a zinc-tin-based alloy target, and has poor characteristics reproducibility of the resultant film. JP-A-2-145458 only describes composition (Zn/Sn ratio) of the alloy target used, and does not describe structure thereof. In general, a manufacturing method for a metal oxide thin film by reactive sputtering using a metal target is more likely to provide significant variation of film composition and film characteristics, and reduce yield. Charging of DC power with a charged power density of as high as equal to or higher than 2.0 $W/cm^2$ particularly provides significant variation of film characteristics and deteriorates productivity.

As described above, in consideration of productivity of a transparent conductive film, manufacturing cost reduction, and quality stabilization of film-formed products, it is desirable to obtain a transparent conductive film using the oxide sintered body as a raw material, and a DC sputtering method charged with high DC power, or an ion plating method.

However, there is no practical use of the oxide sintered body for a sputtering target, or the oxide sintered body for an ion plating tablet, to provide high-speed film formation of a Zn—Sn—O-based thin film; namely, a conventional oxide sintered body generates a problem of arcing generation or the like by charging high DC power, therefore the selection here is limited only to film formation by charging low DC power, or by a high frequency sputtering method which provides low-speed film formation, and thus high productivity cannot be attained.

In addition, generation of arcing during film formation causes generation of particles and may also reduce product yield. In addition, continued arcing generation not only inhibits film formation itself but also inhibits manufacturing of a high quality film because of generation of damage in a film itself.

Reactive sputtering using a zinc-tin-based alloy target, described in JP-A-2-145458, is more likely to attain high-speed film formation of a metal oxide thin film made of zinc and tin, however, stable manufacturing is inhibited because of large variation of film composition or conductivity or transmittance. Sputtering film formation using a Zn—Sn—O-based oxide target is promising in reducing variation of film characteristics, however, there is only a film forming example using high frequency sputtering as described in JP-A-8-171824, and there was no sputtering targets which can stably be used in DC sputtering which is widely used industrially and advantageous in high-speed film formation. Under these circumstances, such the oxide sintered body for a target or an ion plating tablet has been required that does not generate arcing even under charging of high DC power, and is capable of high-speed film formation.

SUMMARY OF THE INVENTION

An oxide transparent conductive film having anatomic number ratio, Sn/(Zn+Sn), of 0.23 to 0.50, manufactured by using, as a raw material, the oxide sintered body substantially containing zinc, tin and oxygen, having an atomic number ratio, Sn/(Zn+Sn), of 0.23 to 0.50, and using a sputtering method or an ion plating method, is more likely to provide a film excellent in chemical resistance. However, in the oxide sintered body having the above composition, until now, there was not such one as is capable of forming a film in a stable manner and in high-speed, without generation of arcing or cracking, even under charging of high DC power; thus, it is an object of the present invention to provide such the oxide sintered body.

The present inventors have extensively studied on arcing generation states by film formation using a DC sputtering method, using oxide sintered bodies containing various textures of zinc and tin, and having a ratio of atomic number, Sn/(Zn+Sn), of 0.23 to 0.50, as a sputtering target, and found that the arcing generation frequency increases by presence of a tin oxide crystal phase in the oxide sintered body, under charging of high DC power (a DC power density of equal to or higher than 1.764 $W/cm^2$); and further, the arcing does not generate when a tin oxide crystal phase is not present in the oxide sintered body, and the oxide sintered body is composed only of zinc oxide having tin as a solid solution, and a zinc stannate compound; and have thus completed the present invention.

Namely, according to a first aspect of the present invention, a oxide sintered body substantially containing zinc, tin and oxygen, characterized by containing tin at an atomic number ratio, Sn/(Zn+Sn), of 0.23 to 0.50, and being composed mainly of a zinc oxide phase and at least one kind of zinc stannate compound phase, or being composed of at least one kind of zinc stannate compound phase is provided.

In addition, according to a second aspect of the present invention, the oxide sintered body according to the first aspect, characterized by substantially not containing a tin oxide crystal phase or a tin oxide crystal phase having zinc as a solid solution is provided.

In addition, according to a third aspect of the present invention, the oxide sintered body according to the first aspect, characterized by further containing at least one kind of an element selected from gallium, aluminum, titanium, niobium, tantalum, tungsten, molybdenum, or antimony, as an additive element, and content of the additive element is equal to or less than 0.08, as atomic number ratio, with respect to total amount of total metal elements, is provided.

In addition, according to a fourth aspect of the present invention, the oxide sintered body according to any one of the first to the third aspects, characterized in that resistivity thereof is equal to or lower than 5 kΩcm, is provided.

Further, according to a fifth aspect of the present invention, the oxide sintered body according to the fourth aspect, characterized in that resistivity thereof is equal to or lower than 100 Ωcm, is provided.

On the other hand, according to a sixth aspect of the present invention, a method for manufacturing the oxide sintered body according to anyone of the first to fifth aspects, characterized in that the oxide sintered body is obtained by formulating an aqueous solvent to raw material powder containing powder of a zinc stannate compound, or mixed powder of tin oxide powder and zinc oxide powder, and after mixing the resulting slurry for equal to longer than 15 hours, by subjecting the slurry to solid-liquid separation, drying and granulation, and subsequently compacting by charging the granule into a mold, followed by sintering the resultant compact under sintering atmosphere with an oxygen concentration, as volume ratio, of equal to or higher than 30%, at 1300 to 1500° C. for equal to or longer than 15 hours, is provided.

In addition, according to a seventh aspect of the present invention, the method for manufacturing the oxide sintered body according to the sixth aspect, characterized in that average grain size of the raw material powder is equal to or smaller than 1 μm, is provided.

On the other hand, according to an eighth aspect of the present invention, the method for manufacturing the oxide sintered body according to the sixth aspect, characterized in that tin content in the raw material powder is 0.23 to 0.50, as atomic number ratio, Sn/(Zn+Sn), is provided.

In addition, according to a ninth aspect of the present invention, the method for manufacturing the oxide sintered body according to the sixth aspect, characterized in that mixing time of the raw material powder is equal to or longer than 18 hours is provided.

In addition, according to a tenth aspect of the present invention, the method for manufacturing the oxide sintered body according to the sixth aspect, characterized in that mixing time of the raw material powder is equal to or longer than 20 hours, is provided.

Further, according to an eleventh aspect of the present invention, a target obtainable by fabrication of the oxide sintered body according to any one of the first to fifth aspects, is provided.

On the other hand, according to a twelfth aspect of the present invention, a method for manufacturing an oxide transparent conductive film, characterized by using the target according to the eleventh aspect, and forming a transparent thin film of an oxide onto a substrate using a sputtering method or an ion plating method, is provided.

In addition, according to a thirteenth aspect of the present invention, the method for manufacturing the oxide transparent conductive film according to the twelfth aspect, characterized in that the sputtering method is a DC sputtering method wherein a DC charge power density of over 1.764 W/cm$^2$ is charged to the target, is provided.

Further, according to a fourteenth aspect of the present invention, an oxide transparent conductive film characterized by obtaining by the method according to the twelfth or thirteenth aspect, and by substantially containing zinc, tin and oxygen, and by containing tin at the atomic number ratio, Sn/(Zn+Sn), of 0.23 to 0.50, is provided.

The oxide sintered body of the present invention is the oxide sintered body substantially containing zinc, tin and oxygen, containing tin at an atomic number ratio, Sn/(Zn+Sn), of 0.23 to 0.50, and being composed mainly of a zinc oxide phase and at least one kind of zinc stannate compound phase, and thus use thereof as a sputtering target is capable of high-speed film formation without generation of arcing or crack, even by adoption of a DC sputtering method under high power charging. The oxide sintered body of the present invention can also be used as a tablet for ion plating under high power charging, and is similarly capable of providing high-speed film formation. In addition, because of being film formation from the oxide sintered body, the resultant film in mass production has stable characteristics and excellent chemical resistance.

In addition, a method according to the present invention is capable of manufacturing, in high productivity, a transparent conductive film excellent in chemical resistance, and is thus industrially extremely useful.

BRIEF DESCRIPTION OF THE DRAWING

FIG. 1 is a chart showing an X-ray diffraction pattern to analyze the oxide sintered body of the present invention, by a θ-2θ scanning method using CuKα ray.

DETAILED DESCRIPTION OF THE INVENTION

The oxide sintered body of the present invention, a manufacturing method therefor, a manufacturing method for transparent conductive film using the same, and the resultant transparent conductive film will be explained in detail below.

1. Oxide Sintered Body

The oxide sintered body of the present invention is the oxide sintered body substantially containing zinc, tin and oxygen, characterized by containing tin at an atomic number ratio, Sn/(Zn+Sn), of 0.23 to 0.50, and being composed mainly of a zinc oxide phase and at least one kind of zinc stannate compound phase.

The oxide sintered body of the present invention is the oxide sintered body containing tin and zinc, which is used as a sputtering target or an ion plating tablet. Therefore, tin content is required to be 0.23 to 0.50 as atomic number ratio, Sn/(Zn+Sn). Forming the above-described zinc stannate phase in the oxide sintered body enhances strength of the sintered body and thus makes utilization possible as a target (or a tablet) without generation of crack even under high power charging.

The atomic number ratio, Sn/(Zn+Sn), of the oxide sintered body below 0.23 makes also the atomic number ratio, Sn/(Zn+Sn), of the resultant film below 0.23; which cannot provide chemical resistance and also makes difficult to form a zinc stannate compound in the oxide sintered body, and thus does not improve strength of the oxide sintered body. On the other hand, the atomic number ratio, Sn/(Zn+Sn), over 0.50 not only is unavoidable to form a tin oxide crystal phase in the oxide sintered body but also reduces transmittance of a film. The content of tin, as the atomic number ratio, Sn/(Zn+Sn), is preferably 0.23 to 0.50, further preferably 0.23 to 0.40, and most preferably 0.23 to 0.30.

In the oxide sintered body having the atomic number ratio, Sn/(Zn+Sn), of 0.20 or lower, because tin completely dissolves in zinc oxide, as a solid solution, a tin oxide phase-does not remain in the oxide sintered body. However, in the oxide sintered body having the atomic number ratio, Sn/(Zn+Sn), of 0.23 or larger, in general, because tin does not completely dissolve in zinc oxide, as a solid solution, a tin oxide phase is more likely to be formed in the oxide sintered body. The oxide sintered body of the present invention, however, is characterized by not containing a tin oxide crystal phase. Here, the tin oxide crystal phase includes $SnO_2$, $Sn_3O_4$, $Sn_2O_3$, SnO, or a substance having other elements such as Zn, as a solid solution, in a crystal thereof. Inclusion of a tin oxide crystal generates arcing and the reason therefor is estimated to be as follows: Namely, exposure of a tin oxide crystal phase, a factor causing arcing, to plasma during film formation more likely reduces the phase to convert to an SnO phase having high resistance (See "Transparent conductive film technology", Japan Society for the Promotion of Science, published by Ohmsha, Ltd., page 125, published in 1999), and irradiation of sputtering gas ion (Ar ion) onto the SnO phase generates charging and results in generation of arcing; however, a zinc oxide crystal or a crystal of a zinc stannate compound maintains a stable conductive phase even by exposure to plasma.

In the present invention, the above zinc oxide crystal includes ZnO or also the case where a tin element is contained as a solid solution therein; in addition, those with a non-stoichiometric composition such as oxygen deficit or zinc deficit are also included. In addition, the addition of at least one kind of gallium, aluminum, titanium, niobium, tantalum, tungsten, molybdenum, or antimony does not pose a problem; also such an additional element may be contained at the zinc site as a solid solution. In addition, zinc oxide usually takes a wurtzite type structure.

In addition, the above zinc stannate compound includes $ZnSnO_3$, $Zn_2SnO_4$ or also those having a tin element, as a solid solution, at the Zn site thereof; in addition, those introduced with oxygen deficit, or with a non-stoichiometric composition such as having a little deviated ratio of Sn/(Zn+Sn) from these compounds are also included. In the present invention, one having $ZnSnO_3$ occupying equal to or higher than 50% with respect to the zinc oxide phase is preferable. The $ZnSnO_3$ phase is described in the JCPDS card, 52-1381.

In addition, a solid solution of at least one kind of gallium, aluminum, titanium, niobium, tantalum, tungsten, molybdenum, or antimony at the site of Zn and/or the site of Sn in these compounds does not pose a problem; further, at least one kind of an element selected from gallium, aluminum, titanium, niobium, tantalum, tungsten, molybdenum, or antimony may be an additive element; in this case, the inclusion in an atomic number ratio of equal to or less than 0.08, with respect to total amount of the total metal elements is preferable. It is because the ratio of the additive elements over 0.08 extremely increases resistivity of the resultant thin film. Inclusion of these additive elements in a ratio of equal to or less than 0.08 is suitable because of not only reducing resistivity of the transparent conductive film but also resistivity of the oxide sintered body. These additive elements may be included as oxide morphology in the oxide sintered body, or as a substitution form at the zinc site of the zinc oxide phase, or a substitution form at the tin site and/or zinc site of the zinc stannate compound.

In addition, the oxide sintered body of the present invention, for example, may include other elements, for example, indium, iridium, ruthenium, rhenium and the like as impurities, in a range not to impair features of the present invention.

In addition, resistivity of the sintered body is preferably equal to or lower than 5 kΩcm in the case of the oxide sintered body containing zinc and tin. It is because the resistivity over 5 kΩcm makes difficult to stably form a film by DC sputtering. Because film formation speed in DC sputtering depends on resistivity of the oxide sintered body, a sputtering target, use of the oxide sintered body having resistivity as low as possible is preferable, when productivity is considered. Resistivity of the sintered body equal to or lower than 100 Ωcm is capable of attaining further high-speed film formation.

In addition, in the case of high resistivity, reduction processing by heating under non-oxidative atmosphere such as nitrogen or the like is capable of reducing resistivity of the oxide sintered body.

However, resistivity of the oxide sintered body equal to or lower than 5 kΩcm is not always capable of providing stable DC sputtering. Even in the case where resistivity of the oxide sintered body is equal to or lower than 5 kΩcm, local inclusion of a substance phase having high resistance over 5 kΩcm (for example, the above SnO phase having high resistance) results in charging by irradiation of sputtering gas ions thereon, resulting in arcing generation and inhibiting stable DC sputtering. Therefore, it is important that resistivity of the oxide sintered body as a whole is equal to or lower than 5 kΩcm, without locally containing a phase having high resistance.

2. Manufacturing Method for Oxide Sintered Body

The oxide sintered body of the present invention is not especially limited in view of a manufacturing method therefor, and may be manufactured either from only a zinc stannate compound, or from a combination of a tin metal and zinc oxide, or from a combination of tin oxide and a zinc metal, however, use of tin oxide and zinc oxide as raw material powder is preferable.

Namely, a manufacturing method for the oxide sintered body of the present invention is characterized in that the oxide sintered body is obtained by formulating an aqueous solvent to raw material powder containing powder of a zinc stannate compound, or mixed powder of tin oxide powder and zinc oxide powder, and after mixing the resulting slurry for equal to longer than 15 hours, by subjecting the slurry to solid-liquid separation, drying and granulation, and subsequently compacting by charging the granule into a mold, followed by sintering the resultant compact under oxygen atmosphere, at 1300 to 1500° C. for equal to or longer than 15 hours.

To obtain the oxide sintered body of the present invention, powder of a zinc stannate compound may be used alone, as raw material powder, however, it is preferable to be mixed powder of zinc oxide and tin oxide. It is because use of a combination of zinc oxide and a tin metal, or a combination of tin oxide and a zinc metal, as raw material powder, provides presence of metal particles of tin or zinc in the resultant oxide sintered body, and thus melts metal particles of the target surface during film formation, resulting in non releasing thereof from the target and generating considerable difference in the composition between the resultant film and the target, and thus not preferable.

Average grain size of raw material powder is desirably equal to or smaller than 1 μm. For example, ZnO powder with an average grain size of equal to or smaller than 1 µm, and $SnO_2$ powder with an average grain size of equal to or smaller than 1 µm are formulated as raw material powder so that an atomic number ratio, shown by Sn/(Zn+Sn), is 0.23 to 0.50, and the mixture charged into a resin pot along with water and mixed by a wet process ball mill. In this case, as the ball, for example, a hard ball made of $ZrO_2$ is used. In addition, a wet process mixing method is capable of providing good result, although a dry process mixing method may also be adopted.

Here the reason for setting tin content to be 0.23 to 0.50, as atomic number ratio, shown by Sn/(Zn+Sn), is that the ratio below 0.23 provides insufficient chemical resistance of the transparent conductive film manufactured from the oxide sintered body, while the ratio over 0.50 is more likely to form a tin oxide crystal phase in the oxide sintered body. As described above, this tin oxide crystal phase causes arcing during film formation.

Wet process mixing time is equal to or longer than 15 hours and preferably equal to or longer than 18 hours. Insufficient mixing time results in generation of a tin oxide crystal phase in the finally resultant oxide sintered body.

Subsequently, after mixing, slurry is taken out to be subjected to filtering, drying and granulating, to be compacted by pressurization with a pressure of 3 tons/cm$^2$ by a cold hydrostatic press.

Then, sintering is required by putting the resultant compact in a sintering furnace under the following set conditions: introduction of oxygen into the sintering furnace at a speed of 5 L/min per 0.1 m$^3$ of inner furnace volume, so as to make oxygen concentration of the calcination atmosphere to be equal to or higher than 30% (by volume ratio) to make the oxygen concentration higher than in air (an oxygen concentration of 21% in the calcination atmosphere); and at a temperature of 1300 to 1500° C. for 15 hours or longer, preferably 20 hours or longer. In addition, calcination of the oxide sintered body of the present invention at a high temperature of 1300 to 1500° C. in air or under reducing atmosphere with oxygen concentration lower than that in air results in active vaporization of a zinc metal, by which composition (Sn/(Sn+Zn)) of the sintered body varies extremely largely, and thus the oxide sintered body having objective composition cannot be obtained. To avoid this, calcination at the above temperature is required, by introducing oxygen into the sintering furnace so as to make oxygen concentration of the calcination atmosphere higher than that in air.

In addition, calcination at a high temperature of 1300 to 1500° C. under atmosphere with oxygen concentration lower than that in air is more likely to leave a tin oxide phase in the oxide sintered body; one reason therefore may be lowering of zinc in the oxide sintered body, and thus conversion to composition with excess tin; other cause thereof is considered to be reduction of tin dioxide in raw material powder under reducing atmosphere at 1300 to 1500° C. which is more likely to generate tin monoxide having poor reactivity, and thus leaving a tin monoxide phase which does not form a zinc stannate compound phase. Namely, reason for calcination under the following condition is to inhibit generation of a tin oxide phase in the finally resultant oxide sintered body; introducing oxygen into the sintering furnace so as to make oxygen concentration of the calcination atmosphere higher than in air, and at a temperature of 1300 to 1500° C. for equal to or longer than 15 hours, preferably equal to or longer than 20 hours.

In addition, as a calcination method for obtaining the oxide sintered body of the present invention, a convenient calcination method under normal pressure may be adopted, however, a hot press method may also be adopted.

In addition, subsequently, the oxide sintered body of the present invention, containing zinc and tin, may be subjected to reduction processing by heating under vacuum or atmosphere with low oxygen concentration than in air. Condition of carrying out the reduction processing may be an annealing temperature of 500 to 900° C., preferably 600 to 800° C., and an annealing time of 7 to 15 hours, preferably 8 to 12 hours. Carrying out the reduction processing is capable of reducing resistivity of the oxide sintered body.

3. Target

The target of the present invention is one obtainable by fabrication of the oxide sintered body; namely, the target of the present invention (which may also be called a single target) is obtained by fabrication of the oxide sintered body manufactured by the above method, and by surface grinding or the like, to a predetermined dimension, and subsequently by adhering onto a backing plate. If necessary, several pieces of the sintered bodies may be arranged in a divided form to make a target with large area (which may also be called a composite target).

Resistivity of the target required in stable film formation by a DC sputtering method, in the case of the oxide sintered body containing tin and zinc, is equal to or lower than 5 kΩcm. In DC sputtering, lower resistivity of oxide sintered body, as the sputtering target, provides higher-speed film formation, and the resistivity equal to or lower than 100 Ωcm attains further higher film formation speed. In addition, in the case of high resistivity, as described above, reduction processing, by heating under non-oxidative atmosphere like nitrogen or the like, is capable of reducing resistivity of the oxide sintered body.

A target includes a target for sputtering, and a target for ion plating. In addition, in an ion plating method, this material may also be called a tablet, however, in the present invention, it is also called "target", as a general name.

4. Oxide Transparent Conductive Film and Manufacturing Method Therefor

The method for manufacturing the oxide transparent conductive film of the present invention is characterized by using the above target, and forming a transparent thin film of an oxide onto a substrate using a sputtering method or an ion plating method.

As a sputtering method, a high frequency sputtering method may also be used, however, a film formation by a DC sputtering method, where less natural heating is provided from plasma to a substrate, is preferable, and a film formation under high DC charge power density is preferable to raise productivity.

In the manufacturing method for the transparent conductive film of the present invention, a DC charge power density of over 1.764 W/cm$^2$ is charged to the target in film formation by a DC sputtering method using the oxide sintered body of the present invention as a target.

To increase film formation rate so as to raise productivity, film formation by a DC sputtering method is preferable, because higher DC charge power to a target increases film formation speed. The charge power density is a value, (P/S), obtained by dividing charge power (P) to the target with the sputtering surface (S) of the target.

In general, in the case where a target includes a substance having high resistivity and is more likely to be charged, or an insulator, higher charge power density is more likely to generate arcing. Use of the oxide sintered body of the present invention as a target, however, does not generate arcing, even under a DC charge power density over 1.764 W/cm$^2$, and is thus capable of providing a stable film formation. In addition, the upper limit of the DC charge power density depends on an apparatus to be used, and thus not especially limited. In the present invention, a film may be formed without heating a substrate, however, the substrate may be heated at 50 to 300° C., in particular 80 to 200° C.

The oxide transparent conductive film of the present invention is formed on the substrate, using the target obtained by fabrication of the oxide sintered body, by means of a sputtering method or an ion plating method. Use of the oxide sintered body of the present invention as the target is capable of forming a film by a DC sputtering method; in addition, the resultant oxide transparent conductive film is a transparent conductive film excellent in chemical resistance and having high transmittance in the visible light range.

In the case of an ion plating method, characteristics of a film obtained by using the ion plating tablet, prepared by the oxide sintered body of the present invention, is similar to that in the sputtering, resulting in a transparent conductive film excellent in chemical resistance and having high transmittance in the visible light range.

In the resultant oxide transparent conductive film in this way, tin content is 0.23 to 0.50 as atomic number ratio, Sn/(Zn+Sn). This range of the tin content is capable of providing a transparent conductive film excellent in chemical resistance and having a resistivity of equal to or lower than 5 k$\Omega$cm. In addition, preferable tin content is 0.23 to 0.35 as atomic number ratio, Sn/(Zn+Sn), and this range is capable of providing a transparent conductive film having a resistivity of equal to or lower than 800 $\Omega$cm, further preferably having a resistivity of equal to or lower than 100 $\Omega$cm.

The transparent conductive film having the above composition is a transparent conductive film excellent in chemical resistance and having high transmittance in the visible light range. "Chemical resistance" here represents, for example, no corrosion even against a solution of 3% potassium hydroxide or sodium hydroxide at 30° C., and in this way, the transparent conductive film substantially has excellent characteristics so as to maintain conductivity and transmittance in the visible light range.

In the present invention, thickness of the transparent conductive film depends of applications and cannot especially be specified; however, is 20 to 500 nm, preferably 100 to 300 nm. The thickness below 20 nm is not capable of securing sufficient resistivity, while the thickness over 500 nm is not preferable because of generating a problem of film coloring.

In addition, average transmittance in the visible light range, 400 to 800 nm, of the transparent conductive film is equal to or larger than 80%, preferably equal to or larger than 85%, and further preferably equal to or larger than 90%. The average transmittance below 80% makes applications difficult to solar batteries or various display elements, or optical filters for displays.

In the present invention, the transparent conductive film usually provides a transparent conductive substrate by forming a film on any of a substrate (a base plate) selected from a glass plate, a quartz plate or a resin plate or a resin film.

This transparent conductive substrate is one for functioning as an anode and/or a cathode of display panels such as LCD, PDP or EL elements. The substrate is required to have a certain level of strength and transparency because it also functions as a light transmission carrier.

A material configuring the resin plate or the resin film includes, for example, polyethylene terephthalate (PET), polyethersulfone (PES), polyarylate (PAR), polycarbonate (PC) or the like; the resin plate or the resin film having structure coated with an acrylic resin at the surface thereof may also be adopted.

Thickness of the substrate is not especially limited, however, 0.5 to 10 mm, preferably 1 to 5 mm for the glass plate or the quartz plate; 0.1 to 5 mm, preferably 1 to 3 mm for the resin plate or the resin film. The substrate thinner than these ranges is weaker and makes handling difficult. On the other hand, the substrate thicker than these ranges is not only poor in transparency but also heavy, and thus not preferable.

On the substrate, any of an insulating layer, a semiconductor layer, a gas barrier layer, or a protecting layer may be formed, composed of a single layer or a multiple layer. The insulating layer includes a silicon oxide (Si—O) film or a silicon oxynitride (Si—O—N) film; the semiconductor layer includes a thin film transistor (TFT) mainly formed on the glass plate; the gas barrier layer includes a silicon oxide (Si—O) film, a silicon oxynitride (Si—O—N) film, a magnesium aluminate (Al—Mg—O) film, or a tin oxide-based (for example, Sn—Si—O) film, as a water vapor barrier film or the like, formed onto a resin plate or a resin film; and the protecting layer is one for preventing the substrate surface from scarring or impact, and various coatings based on Si, Ti, an acrylic resin and the like are used. In addition, a layer formable on the substrate is not limited thereto, and a thin metal film having conductivity may also be applied.

The transparent conductive substrate obtained by the present invention is extremely useful as a component part of various display panels, because a transparent conductive film, having excellent characteristics in view of resistivity, light transmittance, surface flatness and the like, is formed. In addition, parts surface mounted with an electronic circuit and equipped with the transparent conductive substrate include laser parts, in addition to solar batteries or organic EL elements.

EXAMPLES

The present invention will specifically be explained below with reference to Examples, however, the present invention should not be limited thereto. In addition, the resultant oxide sintered body and transparent conductive film were evaluated by the following methods:

(Evaluation of the Oxide Sintered Body)

Resistivity of the resultant oxide sintered body was measured on the polished surface by a four-pin probe method.

On the other hand, generated phases were identified by powder X-ray diffraction measurement of the resultant oxide sintered body; diffraction peaks originating from a tin oxide phase of a rutile structure, a zinc stannate phase, $ZnSnO_3$, described by the JCPDS card, 52-1381, and zinc oxide were observed. In addition, by local composition analysis by EPMA, whether or not tin was dissolved, as a sold solution, in a zinc oxide crystal phase was determined. Further, composition of the oxide sintered body was analyzed using an ICP emission spectroscopy.

(Evaluation of the Oxide Transparent Conductive Film)

The resulting oxide transparent conductive film was immersed into an aqueous solution of 3% KOH (30° C.) for about 10 minutes to determine change in film quality so as to confirm whether or not the film is excellent in alkali resistance.

Examples 1 to 7

Manufacturing of the Oxide Sintered Body

Firstly, ZnO powder with an average grain size of equal to or smaller than 1 μm, and $SnO_2$ powder with an average grain size of equal to or smaller than 1 μm were used as raw material powder, formulated at an atomic number ratio, Sn/(Zn+Sn), of 0.25, charged into a resin pot together with water, and mixed by a wet process ball mill. In this case, a hard ball made of $ZrO_2$ was used, and mixing time was set to 18 hours. After mixing, slurry was taken out and subjected to filtering, drying and granulation.

The granule was subjected to compacting by pressurization under a pressure of 3 tons/cm² by a cold hydrostatic press.

Then, the resultant compact was sintered under atmosphere introduced with oxygen into the atmosphere of the sintering furnace at a speed of 5 L/min. per 0.1 m³ of inner furnace volume (oxygen concentration of the calcination atmosphere to be 55%) at a temperature of 1450° C. for 20 hours. In this case, the temperature was raised by 1°C/min. Cooling after sintering was carried out by 10° C./min down to 1000° C., by stopping oxygen introduction.

End parts of the resultant oxide sintered body were subjected to powder X-ray diffraction measurement. As for the oxide sintered body having a atomic number ratio, Sn/(Zn+Sn) of 0.25, diffraction peaks originating from the zinc oxide crystal phase of a wurtzite type structure, and the zinc stannate phase, $Zn_2SnO_4$, described by the JCPDS card, No. 24-1470 were observed; however, a diffraction peak originating from tin oxide such as $SnO_2$ or SnO or the like was not observed. FIG. 1 shows an X-ray diffraction pattern of the oxide sintered body by a θ-2θ scanning method, using CuKα ray. In addition, local composition analysis by EPMA showed that tin was dissolved, as a sold solution, in the zinc oxide crystal phase. Composition analysis of the resultant oxide sintered body, by ICP emission spectroscopy, showed that the composition was the same as that in raw material powder in formulation.

Manufacturing of the Target

The resultant oxide sintered body was fabricated to a size of a diameter of 152 mm and a thickness of 5 mm, and the sputtering surface was polished with a cup wheel stone, so that maximal height Rz is equal to or less than 3.0 μm. Resistivity of the resultant oxide sintered body was measured on the polished surface by a four-pin probe method and found to be 3.5 kΩcm. Thus fabricated oxide sintered body was bonded, using metal indium, to a backing plate made of oxygen-free copper, to prepare the target.

Manufacturing of the Transparent Conductive Film

The sputtering target was mounted at the cathode for a non-magnetic body target of a DC magnetron sputtering apparatus equipped with a DC power source without arcing control function; a glass substrate was arranged at an opposing position of the sputtering target; and a part of just above the center of the sputtering target on the glass substrate was marked with a felt pen. Then, target-substrate distance was set to 60 mm; the substrate was mounted, without heating, at the standing still, opposing position to the sputtering target. After purging target-substrate space down to equal to or less than $1×10^{-4}$ Pa, gas pressure was adjusted to 0.5 Pa by introduction of pure argon gas mixed with 0.1 to 10% of oxygen gas; DC was charged so as to be 50 to 600 W (a DC charge power per unit surface area of the target surface of 0.276 to 3.308 W/cm²) to generate DC plasma and form a film by sputtering, on the substrate for 10 minutes. After film formation, the felt pen mark and the film deposited thereon were removed with acetone to measure generated step difference, namely film thickness, using a surface roughness meter. Surface resistance of the film was measured by a four-pin probe method, and resistivity was calculated by multiplying surface resistance and film thickness. Resistivity of the film depended on oxygen amount introduced during sputtering, and optimal oxygen amount providing the lowest resistivity was determined. The optimal oxygen amounts in various DC charge power values, and resistivity of the film and filth formation speed at the optimal oxygen amount were evaluated. These results are shown in Table 1.

In addition, the oxide sintered body of the present invention is capable of stably discharging without arc generation, even under charging of 1 kW (a DC charge power density of 5.513 W/cm²). In addition, it was also confirmed that the target showed no crack or breakage, and the sintered body had sufficient strength. Strength of this oxide sintered body is considered to be originated from a zinc stannate compound phase formed in the sintered body.

TABLE 1

|  | DC charge power (W/cm²) | Optimal oxygen amount for min. resistivity (%) | Film resistivity at optimal oxygen amount (Ωcm) | Film formation speed at optimal oxygen amount (nm/min) |
| --- | --- | --- | --- | --- |
| Example 1 | 0.276 | 0.2 | 1.7 | 20 |
| Example 2 | 0.551 | 0.3 | 1.7 | 32 |
| Example 3 | 1.103 | 0.5 | 1.7 | 72 |
| Example 4 | 1.654 | 1.1 | 1.7 | 125 |
| Example 5 | 2.206 | 2 | 1.7 | 186 |
| Example 6 | 2.757 | 3 | 1.7 | 275 |
| Example 7 | 3.308 | 4 | 1.7 | 375 |

Then, to study electrical and optical characteristics of the film, the transparent conductive film with a thickness of 300 nm was prepared on a substrate, under condition in Examples 1 to 7, which yielded the lowest resistance. Surface resistance the film was measured by a four-pin probe method, and resistivity was calculated by multiplying surface resistance and filth thickness, and found to be 1.7 Ωcm. Further, optical characteristics was measured by a spectrometer (manufactured by Hitachi Ltd.), and found that transmittance in the visible light range, 400 to 800 nm, of the film itself is equal to or larger than 85%. In addition, the resulting film was immersed into an aqueous solution of 3% KOH (30° C.) for about 10 minutes, and found that the film quality was not changed and thus and thus found to be excellent in alkali resistance.

In addition, within a variation range of charge power to the target, 50 W to 600 W, (a DC charge power per unit surface area of the target surface of 0.276 to 3.308 W/cm²), discharging was stable. As shown by Table 1, increase in charge power was confirmed to increase film formation speed, and preparation of a sputtering target, advantageous in high-speed film formation, was proved to be possible from the oxide sintered body of the present invention. In addition, composition of the film was analyzed using an ICP emission spectroscopy, and found to be nearly the same as that of the target. Film composition did not depend on charge power and was also not different by each film formation. In this way, because film composition does not depend on film formation condition, the sintered body can be used in manufacturing with high yield.

Example 8

The oxide sintered body was prepared in the same way as in Example 1, except that the atomic number ratio, Sn/(Zn+Sn), was changed to 0.23, and the oxygen amount in the calcination atmosphere was changed to 40%. End parts of the resultant oxide sintered body was subjected to powder X-ray diffraction measurement; as for the oxide sintered body having a atomic number ratio, Sn/(Zn+Sn), of 0.23, diffraction peaks originating from the zinc oxide crystal phase of a wurtzite type structure, and the zinc stannate phase, $Zn_2SnO_4$, described by the JCPDS card, No. 24-1470 were observed; however, a diffraction peak originating from tin oxide such as $SnO_2$ or SnO or the like was not observed. Local composition analysis of this sintered body by EPMA showed that tin was dissolved, as a sold solution, in the zinc oxide phase. Composition analysis of the resultant oxide sintered body, by ICP emission spectroscopy, showed that the composition was the same as that in raw material powder in formulation. Resistivity of the resultant oxide sintered body was measured on the sputter surface by a four-pin probe method and found to be 2.5 kΩcm.

Further, a sputtering target was prepared according to the above-described method, using the resultant oxide sintered body.

Subsequently, using this target, a transparent conductive film was prepared under the same condition as in Examples 1 to 7, and resistivity of the resultant transparent conductive film was measured, and found to be $8 \times 10^{-1}$ Ωcm, and transmittance in the visible light range was equal to or higher than 85%, thus proving that the film was a good low resistant transparent conductive film. In addition, the resulting film was immersed into an aqueous solution of 3% KOH (30° C.) for about 10 minutes, and found that the film quality was not changed and thus found to be excellent in alkali resistance.

In addition, within a variation range of charge power to the target, 50 W to 600 W, (a DC charge power per unit surface area of the target surface of 0.276 to 3.308 $W/cm^2$), discharging was stable. In addition, composition of the film was analyzed using an ICP emission spectroscopy, and found to be nearly the same as that of the target. Film composition did not depend on charge power and was also not different by each film formation. In this way, because film composition does not depend on film formation condition, this method can be used in manufacturing with high yield.

In addition, the oxide sintered body of the present invention is capable of stably discharging without arc generation, even under charging of 1 kW (a DC charge power density of 5.513 $W/cm^2$). In addition, it was also confirmed that the target showed no crack or breakage, and the sintered body had sufficient strength. Strength of this oxide sintered body is considered to be originated from a zinc stannate compound phase formed in the sintered body.

Example 9

The oxide sintered body was prepared in the same way as in Example 1, except that the atomic number ratio, Sn/(Zn+Sn) was changed to 0.35, and the oxygen amount in the calcination atmosphere was changed to 70%. The resultant oxide sintered body was subjected to X-ray diffraction measurement; diffraction peaks originating from the zinc oxide crystal phase of a wurtzite type structure, and the zinc stannate phase, $Zn_2SnO_4$, described by the JCPDS card, No. 24-1470, and the zinc stannate phase, $ZnSnO_3$, described by the JCPDS card, No. 52-1381 were observed; however, a diffraction peak originating from tin oxide such as $SnO_2$ or SnO or the like was not observed. Composition analysis of the resultant oxide sintered body, by ICP emission spectroscopy, showed that the composition was the same as that in raw material powder in formulation. Resistivity of the oxide sintered body was measured on the sputter surface by a four-pin probe method and found to be 2.3 kΩcm.

Subsequently, using this target, a transparent conductive film was prepared under the same condition as in Examples 1 to 7, and resistivity of the resultant transparent conductive film was measured, and found to be $5 \times 10^{-1}$ Ωcm, and transmittance in the visible light range was equal to or higher than 85%, thus proving that the film was a good low resistant transparent conductive film. In addition, the resulting film was immersed into an aqueous solution of 3% KOH (30° C.) for about 10 minutes, and found that the film quality was not changed and thus found to be excellent in alkali resistance.

In addition, within a variation range of charge power to the target, 50 W to 600 W, (a DC charge power per unit surface area of the target surface of 0.276 to 3.308 $W/cm^2$), discharging was stable. In addition, composition of the film was analyzed using an ICP emission spectroscopy, and found to be nearly the same as that of the target. Film composition did not depend on charge power and was also not different by each film formation. In this way, because film composition does not depend on film formation condition, this method can be used in manufacturing with high yield.

In addition, the oxide sintered body of the present invention is capable of stably discharging without arc generation, even under charging of 1 kW (a DC charge power density of 5.513 $W/cm^2$). In addition, it was also confirmed that the target showed no crack or breakage, and the sintered body had sufficient strength. Strength of this oxide sintered body is considered to be originated from a zinc stannate compound phase formed in the sintered body.

Example 10

The oxide sintered body was prepared according to the method for manufacturing the oxide sintered body in Example 1, except that the atomic number ratio, Sn/(Zn+Sn), was changed to 0.50, and the oxygen amount in the calcination atmosphere was changed to 65%. The resultant oxide sintered body was subjected to X-ray diffraction measurement; a diffraction peak originating from the zinc stannate phase, $ZnSnO_3$, described by the JCPDS card, No. 52-1381 was observed; however, a diffraction peak originating from tin oxide such as $SnO_2$ or SnO or the like was not observed. Composition analysis of the resultant oxide sintered body, by ICP emission spectroscopy, showed that the composition was the same as that in raw material powder in formulation. Resistivity of the oxide sintered body was measured on the sputter surface by a four-pin probe method and found to be 4.7 kΩcm.

Further, a target was prepared according to the above-described method, using the resultant oxide sintered body.

Subsequently, a transparent conductive film was prepared under the same condition as in Examples 1 to 7, and resistivity of the resultant transparent conductive film was measured, and found to be equal to or lower than $4 \times 10^{-2}$ Ωcm, and transmittance in the visible light range was equal to or higher than 85%, thus proving that the film was a good low resistant transparent conductive film. In addition, the resulting film was immersed into an aqueous solution of 3% KOH (30° C.) for about 10 minutes, and found that the film quality was not changed and thus found to be excellent in alkali resistance.

In addition, within a variation range of charge power to the target, 50 W to 600 W, (a DC charge power per unit surface area of the target surface of 0.276 to 3.308 $W/cm^2$), discharging was stable. In addition, composition of the film was analyzed using an ICP emission spectroscopy, and found to be nearly the same as that of the target. Film composition did not depend on charge power and was also not different by each film formation. In this way, because film composition does not depend on film formation condition, this method can be used in manufacturing with high yield.

In addition, the oxide sintered body of the present invention is capable of stably discharging without arc generation, even under charging of 1 kW (a DC charge power density of 5.513

W/cm²). In addition, it was also confirmed that the target showed no crack or breakage, and the sintered body had sufficient strength. Strength of this oxide sintered body is considered to be originated from a zinc stannate compound phase formed in the sintered body.

Comparative Example 1

The oxide sintered body having the atomic number ratio, Sn/(Zn+Sn), of 0.23 was prepared in the same way as in Example 8, except that $SnO_2$ powder with an average grain size of 3 to 5 μm was used, and mixing time of raw material powder by a wet process boll mill was shortened to 5 hours.

The resultant oxide sintered body was evaluated in the same way as in Example 1; by X-ray diffraction measurement, diffraction peaks originating from the zinc oxide crystal phase of a wurtzite type structure, and $SnO_2$ were observed. Local composition analysis of this sintered body by EPMA showed that tin was dissolved/as a sold solution, in the zinc oxide phase. Composition analysis of the resultant oxide sintered body, by ICP emission spectroscopy, showed that the composition was the same as that in raw material powder in formulation. Resistivity of the resultant oxide sintered body was measured on the sputter surface by a four-pin probe method and found to be 3.5 kΩcm.

Further, a sputtering target was prepared according to the similar method as in Example 1, using the resultant oxide sintered body, and preparation of a transparent conductive film was tried in the same way as in Examples 1 to 7. In addition, in this case, within a variation range of charge power to the target, 50 W to 600 W, (a DC charge power per unit surface area of the target surface of 0.276 to 3.308 W/cm²), discharging became unstable at 430 W (a DC charge power per unit surface area of the target surface of 2.371 W/cm²) or higher by generation of arcing. A target for a mass manufacturing process requiring high productivity cannot be prepared using such the oxide sintered body like this.

Comparative Example 2

The oxide sintered body having the atomic number ratio, Sn/(Zn+Sn), of 0.25 was prepared in the same way as in Example except that $SnO_2$ powder with an average grain size of 3 to 5 μm was used, and mixing time of raw material powder by a wet process boll mill was shortened to 5 hours.

The resultant oxide sintered body was evaluated in the same way as in Example 1; by X-ray diffraction measurement, and local composition analysis by EPMA, the oxide sintered body was found to be composed of the zinc oxide crystal phase of a wurtzite type structure dissolved with tin, as a solid solution, and the zinc stannate phase, $Zn_2SnO_4$, described by the JCPDS card, No. 24-1470, and tin was found to be dissolved, as a solid solution, in the zinc oxide phase. Composition analysis of the resultant oxide sintered body, by ICP emission spectroscopy, showed that the composition was the same as that in raw material powder in formulation. Resistivity of the resultant oxide sintered body was measured on the sputter surface by a four-pin probe method and found to be 4.3 kΩcm.

Further, a sputtering target was prepared according to the similar method as in Comparative Example 1, using the resultant oxide sintered body, and preparation of a transparent conductive film was tried. In addition, within a variation range of charge power to the target, 50 W to 600 W, (a DC charge power per unit surface area of the target surface of 0.276 to 3.308 W/cm²), discharging became unstable at 400 W (a DC charge power per unit surface area of the target surface of 2.206 W/cm²) or higher by generation of arcing.

A target for a mass manufacturing process requiring high productivity cannot be prepared using such the oxide sintered body like this.

Comparative Example 3

The oxide sintered body having the atomic number ratio, Sn/(Zn+Sn), of 0.35 was prepared in the same way as in Example 9, except that $SnO_2$ powder with an average grain size of 3 to 5 μm was used, and mixing time of raw material powder by a wet process boll mill was shortened to 5 hours.

The resultant oxide sintered body was evaluated in the same way as in Example 1; the presence of the zinc stannate phase, $Zn_2SnO_4$, described by the JCPDS card, No. 24-1470, and the zinc stannate phase, $ZnSnO_3$, described by the JCPDS card, No. 52-1381 as well as $SnO_2$ were found. Composition analysis of the resultant oxide sintered body, by ICP emission spectroscopy, showed that the composition was the same as the feeding composition in formulation. Resistivity of the resultant oxide sintered body was measured on the sputter surface by a four-pin probe method and found to be 3.6 kΩcm.

Further, a sputtering target was prepared by the similar processing as in Example 1, using the resultant oxide sintered body, and preparation of a transparent conductive film was tried in the same way as in Example 1. In addition, within a variation range of charge power to the target, 50 W to 600 W, (a DC charge power per unit surface area of the target surface of 0.276 to 3.308 W/cm²), discharging became unstable at 390 W (a DC charge power per unit surface area of the target surface of 2.150 W/cm²) or higher by generation of arcing.

Such the oxide sintered body like this cannot be utilized for a mass manufacturing process requiring high productivity.

Comparative Example 4

The oxide sintered body having the atomic number ratio, Sn/(Zn+Sn), of 0.50 was prepared under the same condition as in Example 10, except that $SnO_2$ powder with an average grain size of 3 to 5 μm was used, and mixing time of raw material powder by a wet process boll mill was shortened to 5 hours.

The resultant oxide sintered body was evaluated in the same way as in Example 1; diffraction peaks of the zinc stannate phase, $ZnSnO_3$, described by the JCPDS card, No. 52-1381 as well as $SnO_2$ were observed. Composition analysis of the resultant oxide sintered body, by ICP emission spectroscopy, showed that the composition was the same as the feeding composition in formulation. Resistivity of the resultant oxide sintered body was measured on the sputter surface by a four-pin probe method and found to be 5.6 kΩcm. Further, a sputtering target was prepared by the similar processing as in Example 1, using the resultant oxide sintered body. In addition, within a variation range of charge power to the target, 50 W to 600 W, (a DC charge power per unit surface area of the target surface of 0.276 to 3.308 W/cm²), discharging became unstable at 320 W (a DC charge power per unit surface area of the target surface of 1.764 W/cm²) or higher by generation of arcing.

Such an oxide sintered body like this cannot be utilized for a mass manufacturing process requiring high productivity.

Comparative Example 5

The oxide sintered body was prepared in the same way as in Example 1, except that the atomic number ratio, Sn/(Zn+

Sn) was set to be 0.20. The resultant oxide sintered body was subjected to X-ray diffraction measurement to study kinds of the configuration phases; a diffraction peak originating from the zinc oxide crystal phase of a wurtzite type structure was observed; however, a diffraction peak originating from tin oxide such as $SnO_2$ or SnO or the like was not observed. Local composition analysis of this sintered body by EPMA showed that tin was dissolved, as a sold solution, in the zinc oxide phase. Composition analysis of the resultant oxide sintered body, by ICP emission spectroscopy, showed that the composition was the same as the feeding composition in formulation. Resistivity of the resultant oxide sintered body was measured on the sputter surface by a four-pin probe method and found to be 500 Ωcm.

Further, a target was prepared according to the above-described method, using the resultant oxide sintered body.

Subsequently, using this target, a transparent conductive film was prepared under the same condition as in Examples 1 to 7, and resistivity of the resultant transparent conductive film was measured, and found to be $6\times10^{-2}$ Ωcm, and transmittance in the visible light range was equal to or higher than 85%, thus proving that the film was a good low resistant transparent conductive film. However, in immersion of the resulting film into an aqueous solution of 3% KOH (30° C.) for about 10 minutes, turbidity and corrosion of the film was found; and thus found to be the film inferior in alkali resistance. This film was found impossible to be used in applications with emphasis on chemical resistance.

In addition, within a variation range of charge power to the target, 50 W to 600 W, (a DC charge power per unit surface area of the target surface of 0.276 to 3.308 $W/cm^2$), discharging was stable. In addition, composition of the film was analyzed using an ICP emission spectroscopy, and found to be nearly the same as that of the target. Film composition did not depend on charge power and was also not different by each film formation. In addition, the oxide sintered body of the present invention is capable of stably discharging without arc generation, even under charging of 1 kW (a DC charge power density of 5.513 $W/cm^2$). However, it was also confirmed that the target showed crack or breakage, and the sintered body had insufficient strength. It seems to be caused by not containing a zinc stannate compound phase in the sintered body.

Comparative Example 6

The oxide sintered body was prepared in the same way as in Example 1, except that the atomic number ratio, Sn/(Zn+Sn), was set to be 0.10. The resultant oxide sintered body was subjected to X-ray diffraction measurement to study kinds of the configuration phases; only a diffraction peak originating from the zinc oxide crystal phase of a wurtzite type structure was observed; and a diffraction peak originating from tin oxide such as $SnO_2$ or SnO or the like was not observed. Local composition analysis of this sintered body by EPMA showed that tin was dissolved, as a sold solution, in the zinc oxide phase. Composition analysis of the resultant oxide sintered body, by ICP emission spectroscopy, showed that the composition was the same as the feeding composition in formulation. Resistivity of the resultant oxide sintered body was measured on the sputter surface by a four-pin probe method and found to be 320 Ωcm.

Further, a target was prepared according to the above-described method, using the resultant oxide sintered body.

Subsequently, using this target, a transparent conductive film was prepared under the same condition as in Examples 1 to 7, and resistivity of the resultant transparent conductive film was measured, and found to be $7\times10^{-3}$ Ωcm, and transmittance in the visible light range was equal to or higher than 85%, thus proving that the film was a good low resistant transparent conductive film. However, in immersion of the resulting film into an aqueous solution of 3% KOH (30° C.) for about 10 minutes, turbidity and corrosion of the film was found; and thus found to be the film inferior in alkali resistance. This film was found impossible to be used in applications with emphasis on chemical resistance.

In addition, within a variation range of charge power to the target, 50 W to 600 W, (a DC charge power per unit surface area of the target surface of 0.276 to 3.308 $W/cm^2$), discharging was stable. In addition, composition of the film was analyzed using an ICP emission spectroscopy, and found to be nearly the same as that of the target. Film composition did not depend on charge power and was also not different by each film formation.

In addition, the oxide sintered body of the present invention is capable of stably discharging without arc generation, even under charging of 1 kW (a DC charge power density of 5.513 $W/cm^2$). However, it was also confirmed that the target showed crack or breakage, and the sintered body had insufficient strength. It seems to be caused by not containing a zinc stannate compound phase in the sintered body. Continued film formation by DC charge power as high as about 1 kW, using the oxide sintered body with crack once generated, was successful in stable manner till about 8 hours, however, in film formation for 10 hours or longer, nodules (black foreign matters of lower oxides) were more likely to be generated at the crack area, and only a film with deteriorated conductivity was obtained.

Comparative Example 7

The oxide sintered body having the atomic number ratio, Sn/(Zn+Sn), of 0.25 was prepared in the same way as in Example 1, except that calcination atmosphere was changed to air (oxygen content in calcination atmosphere is 21%) instead of introducing oxygen.

The resultant oxide sintered body was evaluated in the same way as in Example 1; by X-ray diffraction measurement, and local composition analysis by EPMA, the oxide sintered body was found to be composed of the zinc oxide crystal phase of a wurtzite type structure dissolved with tin, as a solid solution, and the zinc stannate phase, $Zn_2SnO_4$, described by the JCPDS card, No. 24-1470, as well as trace amount of a tin monoxide (SnO) phase, and tin was found dissolved, as a solid solution, in the zinc oxide phase by EPMA. Composition analysis of the resultant oxide sintered body, by ICP emission spectroscopy, showed that zinc composition was about 5% fewer than that in the feeding composition in formulation of raw material powder (in preparation of the oxide sintered body, raw material formulation ratio was set in anticipation of this amount of change in advance). Resistivity of the resultant oxide sintered body was measured on the sputter surface by a four-pin probe method and found to be 1.4 kΩcm.

Further, a sputtering target was prepared according to the similar method as in Example 1, using the resultant oxide sintered body, and preparation of a transparent conductive film was tried. In addition, within a variation range of charge power to the target, 50 W to 600 W, (a DC charge power per unit surface area of the target surface of 0.276 to 3.308 $W/cm^2$), discharging became unstable at 400 W (a DC charge power per unit surface area of the target surface of 2.206 $W/cm^2$) or higher by generation of arcing.

A target for a mass manufacturing process requiring high productivity cannot be prepared using such the oxide sintered body like this.

Comparative Example 8

The oxide sintered body having the atomic number ratio, Sn/(Zn+Sn), of 0.10 was prepared in the same way as in Comparative Example 6, except that calcination atmosphere was changed to air (namely, oxygen content in calcination atmosphere is 21%) instead of introducing oxygen.

The resultant oxide sintered body was evaluated in the same way as in Example 1; by X-ray diffraction measurement, and local composition analysis by EPMA, the oxide sintered body was found to be composed of the zinc oxide crystal phase of a wurtzite type structure dissolved with tin, as a solid solution. In addition, tin was found dissolved, as a solid solution, in the zinc oxide phase, by EPMA. Composition analysis of the resultant oxide sintered body, by ICP emission spectroscopy, showed that zinc, composition was about 4% fewer than that in the feeding composition in formulation of raw material powder (in preparation of the oxide sintered body, raw material formulation ratio was set in anticipation of this amount of change in advance). Resistivity of the resultant oxide sintered body was measured on the sputter surface by a four-pin probe method and found to be 150 Ωcm.

Further, a target was prepared according to the above-described method, using the resultant oxide sintered body.

Subsequently, using this target, a transparent conductive film was prepared under the same condition as in Examples 1 to 7, and resistivity of the resultant transparent conductive film was measured, and found to be $7\times10^{-3}$ Ωcm, and transmittance in the visible light range was equal to or higher than 85%, thus proving that the film was a good low resistant transparent conductive film. However, in immersion of the resulting film into an aqueous solution of 3% KOH (30° C.) for about 10 minutes, turbidity and corrosion of the film was found; and thus found to be the film inferior in alkali resistance. This film was found impossible to be used in applications with emphasis on chemical resistance.

In addition, a sputtering target was prepared according to the similar method as in Example 1, using the resultant oxide sintered body, and preparation of a transparent conductive film was tried. In addition, within a variation range of charge power to the target, 50 W to 600 W, (a DC charge power per unit surface area of the target surface of 0.276 to 3.308 W/cm$^2$), discharging was stable.

In addition, the oxide sintered body of the present invention is capable of stably discharging without arc generation, even under charging of 1 kW (a DC charge power density of 5.513 W/cm$^2$). However, it was also confirmed that the target showed crack or breakage, and the sintered body had insufficient strength. It seems to be caused by not containing a zinc stannate compound phase in the sintered body. Continued film formation by DC charge power as high as about 1 kW, using the oxide sintered body with crack once generated, was successful in stable manner till about 8 hours, however, in film formation for 10 hours or longer, nodules (black foreign matters of lower oxides) were more likely to be generated at the crack area, and only a film with deteriorated conductivity was obtained.

Comparative Example 9

The oxide sintered body having the atomic number ratio, Sn/(Zn+Sn), of 0.25 was prepared in the same way as in Example 1, except that calcination atmosphere was changed to argon so that oxygen content in the calcination atmosphere is 15%.

The resultant oxide sintered body was evaluated in the same way as in Example 1; by X-ray diffraction measurement, and local composition analysis by EPMA, the oxide sintered body was found to be composed of the zinc oxide crystal phase of a wurtzite type structure dissolved with tin, as a solid solution, and the zinc stannate phase, $Zn_2SnO_4$, described by the JCPDS card, No. 24-1470, as well as trace amount of a tin monoxide (SnO) phase. Tin was found to be dissolved, as a solid solution, in the zinc oxide phase by EPMA. Composition analysis of the resultant oxide sintered body, by ICP emission spectroscopy, showed that zinc composition was about 10% fewer than that in the feeding composition in formulation of raw material powder (in preparation of the oxide sintered body, raw material formulation ratio was set in anticipation of this amount of change in advance). Resistivity of the resultant oxide sintered body was measured on the sputter surface by a four-pin probe method and found to be 0.8 kΩcm.

Further, a sputtering target was prepared according to the similar method as in Example 1, using the resultant oxide sintered body, and preparation of a transparent conductive film was tried. In addition, within a variation range of charge power to the target, 50 W to 600 W, (a DC charge power per unit surface area of the target surface of 0.276 to 3.308 W/cm$^2$), discharging became unstable at 400 W (a DC charge power per unit surface area of the target surface of 2.206 W/cm$^2$) or higher by generation of arcing.

A target for a mass manufacturing process requiring high productivity cannot be prepared using such the oxide sintered body like this.

Example 11

The oxide sintered body having the atomic number ratio, Sn/(Zn+Sn), of 0.25, and the atomic number ratio, Ga/(Zn+Sn+Ga), of 0.08 was prepared in the same way as in Example 1, except that $Ga_2O_3$ powder with an average grain size of equal to or smaller than 1 μm was used as well as ZnO powder with an average grain size of equal to or smaller than 1 μm and SnO powder with an average grain size of equal to or smaller than 1 μm, as raw material powder. By analysis of the oxide sintered body in the same way as in Example 1, it was found to be composed of the zinc oxide crystal phase of a wurtzite type structure dissolved with tin and gallium as solid solutions, and the zinc stannate phase, $Zn_2SnO_4$, described by the JCPDS card, No. 24-1470; however, a tin oxide phase such as $SnO_2$ or SnO or the like was not contained. Composition analysis of the resultant oxide sintered body, by ICP emission spectroscopy, showed that the composition was the same as feeding composition in formulation of raw material powder. Resistivity of the resultant oxide sintered body was measured on the sputter surface by a four-pin probe method and found to be 0.11 kΩcm.

Further, a sputtering target was prepared in the same way as in Example 1, using the resultant oxide sintered body, and a transparent conductive film was prepared under the same condition as in Examples 1 to 7. Resistivity of the resultant transparent conductive was found to be $2.1\times10^{-1}$ Ωcm, and transmittance in the visible light range was equal to or higher than 85%, thus proving that the film was a good low resistant transparent conductive film. In addition, the resulting film was immersed into an aqueous solution of 3% KOH (30° C.) for about 10 minutes, and found that the film quality was not changed and thus found to be excellent in alkali resistance.

In addition, within a variation range of charge power to the target, 50 W to 600 W, (a DC charge power per unit surface area of the target surface of 0.276 to 3.308 W/cm$^2$), discharging was stable. In addition, composition of the film was analyzed using an ICP emission spectroscopy, and found to be nearly the same as the target composition. Film composition did not depend on charge power and was also not different by each film formation. In addition, the oxide sintered body of the present invention is capable of stably discharging without arc generation, even under charging of 1 kW (a DC charge power density of 5.513 W/cm$^2$). In addition, it was also confirmed that the target showed no crack or breakage, and the sintered body had sufficient strength. Strength of this oxide sintered body is considered to be originated from a zinc stannate compound phase formed in the sintered body. Therefore, because film composition does not depend on film formation condition, and the sintered body has sufficient strength even in high charge power, the sintered body can be used in manufacturing with high yield.

Example 12

The oxide sintered body having the atomic number ratio, Sn/(Zn+Sn), of 0.25, and the atomic number ratio, Al/(Zn+Sn+Al), of 0.04 was prepared in the same way as in Example 1, except that Al$_2$O$_3$ powder with an average grain size of equal to or smaller than 1 μm was used as well as ZnO powder with an average grain size of equal to or smaller than 1 μm and SnO powder with an average grain size of equal to or smaller than 1 μm, as raw material powder. By evaluation of the oxide sintered body in the same way as in Example 1, it was found to be composed of the zinc oxide crystal phase of a wurtzite type structure dissolved with tin and aluminum as solid solutions, and the zinc stannate phase, Zn$_2$SnO$_4$, described by the JCPDS card, No. 24-1470; however, a tin oxide phase such as SnO$_2$ or SnO or the like was not contained. Composition analysis of the resultant oxide sintered body, by ICP emission spectroscopy, showed that the composition was the same as feeding composition in formulation of raw material powder. Resistivity of the resultant oxide sintered body was 0.43 kΩcm.

Further, a sputtering target was prepared in the same way as in Example 1, using the resultant oxide sintered body, and a transparent conductive film was prepared in the same way as in Examples 1 to 7.

Resistivity of the resultant transparent conductive was found to be 7.1×10$^{-1}$ Ωcm, and transmittance in the visible light range was equal to or higher than 85%, thus proving that the film was a good low resistant transparent conductive film. In addition, the resulting film was immersed into an aqueous solution of 3% KOH (30° C.) for about 10 minutes, and found that the film quality was not changed and thus found to be excellent in alkali resistance.

In addition, within a variation range of charge power to the target, 50 W to 600 W, (a DC charge power per unit surface area of the target surface of 0.276 to 3.308 W/cm$^2$), discharging was stable. In addition, composition of the film was analyzed using an ICP emission spectroscopy, and found to be nearly the same as the target composition. Film composition did not depend on charge power and was also not different by each film formation. In addition, the oxide sintered body of the present invention is capable of stably discharging without arc generation, even under charging of 1 kW (a DC charge power density of 5. 513 W/cm$^2$). In addition, it was also confirmed that the target showed no crack or breakage, and the sintered body had sufficient strength. Strength of this oxide sintered body is considered to be originated from a zinc stannate compound phase formed in the sintered body. Therefore, because film composition does not depend on film formation condition, and the sintered body has sufficient strength even in high charge power, the sintered body can be used in manufacturing with high yield.

Example 13

The oxide sintered body having the atomic number ratio, Sn/(Zn+Sn), of 0.25, and the atomic number ratio, Sb/(Zn+Sn+Sb), of 0.06 was prepared in the same way as in Example 1, except that Sb$_2$O$_5$ powder with an average grain size of equal to or smaller than 1 μm was used as well as ZnO powder with an average grain size of equal to or smaller than 1 μm and SnO powder with an average grain size of equal to or smaller than 1 μm, as raw material powder. By evaluation of the oxide sintered body in the same way as in Example 1, it was found to be composed of the zinc oxide crystal phase of a wurtzite type structure dissolved with tin and antimony as solid solutions, and the zinc stannate phase, Zn$_2$SnO$_4$, described by the JCPDS card, No. 24-1470; however, a tin oxide phase such as SnO$_2$ or SnO or the like was not contained. From local analysis by EPMA, composition analysis of the resultant oxide sintered body, by ICP emission spectroscopy, showed that the composition was the same as feeding composition in formulation of raw material powder. Resistivity of the resultant oxide sintered body was 0.85 kΩcm.

Further, a sputtering target was prepared in the same way as in Example 1, using the resultant oxide sintered body, and a transparent conductive film was prepared in the same way as in Examples 1 to 7. Resistivity of the resultant transparent conductive was found to be equal to or lower than 3.5×10$^{-1}$ Ωcm, and transmittance in the visible light range was equal to or higher than 85%, thus proving that the film was a good low resistant transparent conductive film. In addition, the resulting film was immersed into an aqueous solution of 3% KOH (30° C.) for about 10 minutes, and found that the film quality was not changed and thus found to be excellent in alkali resistance.

In addition, within a variation range of charge power to the target, 50 W to 600 W, (a DC charge power per unit surface area of the target surface of 0.276 to 3.308 W/cm$^2$), discharging was stable. In addition, composition of the film was analyzed using an ICE) emission spectroscopy, and found to be nearly the same as the target composition. Film composition did not depend on charge power and was also not different by each film formation. In addition, the oxide sintered body of the present invention is capable of stably discharging without arc generation, even under charging of 1 kW (a DC charge power density of 5.513 W/cm$^2$). In addition, it was also confirmed that the target showed no crack or breakage, and the sintered body had sufficient strength. Strength of this oxide sintered body is considered to be originated from a zinc stannate compound phase formed in the sintered body. Therefore, because film composition does not depend on film formation condition, and the sintered body has sufficient strength even in high charge power, the sintered body can be used in manufacturing with high yield.

Comparative Example 10

The oxide sintered body having the atomic number ratio, Sn/(Zn+Sn), of 0.25, and the atomic number ratio, Ga/(Zn+Sn+Ga), of 0.08 was prepared under the same condition as in Example 11, except that SnO$_2$ powder with an average grain size of 3 to 5 μm was used, and mixing time of raw material powder by a wet process boll mill was shortened to 5 hours.

The resultant oxide sintered body was evaluated in the same way as in Example 1; it was found to be composed of the zinc oxide crystal phase of a wurtzite type structure dissolved with tin as a solid solution, and the zinc stannate phase, $Zn_2SnO_4$, described by the JCPDS card, No. 24-1470, as well as the $SnO_2$ phase. Local composition analysis of this sintered body by EPMA showed that tin was dissolved, as a sold solution, in the zinc oxide phase. Composition analysis of the resultant oxide sintered body, by ICP emission spectroscopy, showed that the composition was the same as the feeding composition in formulation. Resistivity of the resultant oxide sintered body was 2.7 kΩcm.

Further, a sputtering target was prepared in the same way as in Example 1, using the resultant oxide sintered body, and a transparent conductive film was prepared.

In addition, within a variation range of charge power to the target, 50 W to 600 W, (a DC charge power per unit surface area of the target surface of 0.276 to 3.308 $W/cm^2$), discharging became unstable at 400 W (a DC charge power per unit surface area of the target surface of 2.206 $W/cm^2$) or higher by generation of arcing.

Such the oxide sintered body like this cannot be utilized in a mass manufacturing process requiring high productivity.

Example 14

The oxide sintered body having the atomic number ratio, Sn/(Zn+Sn), of 0.25, and the atomic number ratio, Nb/(Zn+Sn+Nb), of 0.04 was prepared in the same way as in Example 1, except that $Nb_2O_5$ powder with an average grain size of equal to or smaller than 1 μm was used as well as ZnO powder with an average grain size of equal to or smaller than 1 μm and $SnO_2$ powder with an average grain size of equal to or smaller than 1 μm, as raw material powder. By evaluation of the oxide sintered body in the same way as in Example 1, it was found to be composed of the zinc oxide crystal phase of a wurtzite type structure dissolved with tin and niobium as solid solutions, and the zinc stannate phase, $Zn_2SnO_4$, described by the JCPDS card, No. 24-1470; however, a tin oxide phase such as $SnO_2$ or SnO or the like was not contained. Composition analysis of the resultant oxide sintered body, by ICP emission spectroscopy, showed that the composition was the same as feeding composition in formulation of raw material powder. Resistivity of the resultant oxide sintered body was 0.25 kΩcm.

Further, a sputtering target was prepared in the same way as in Example 1, using the resultant oxide sintered body, and a transparent conductive film was prepared in the same way as in Examples 1 to 7. Resistivity of the resultant transparent conductive was found to be equal to lower than $5.2 \times 10^{-1}$ Ωcm, and transmittance in the visible light range was equal to or higher than 85%, thus proving that the film was a good low resistant transparent conductive film. In addition, the resulting film was immersed into an aqueous solution of 3% KOH (30° C.) for about 10 minutes, and found that the film quality was not changed and thus found to be excellent in alkali resistance.

In addition, within a variation range of charge power to the target, 50 W to 600 W, (a DC charge power per unit surface area of the target surface of 0.276 to 3.308 $W/cm^2$), discharging was stable. In addition, composition of the film was analyzed using an ICP emission spectroscopy, and found to be nearly the same as the target composition. Film composition did not depend on charge power and was also not different by each film formation. In addition, the oxide sintered body of the present invention is capable of stably discharging without arc generation, even under charging of 1 kW (a DC charge power density of 5.513 $W/cm^2$). In addition, it was also confirmed that the target showed no crack or breakage, and the sintered body had sufficient strength. Strength of this oxide sintered body is considered to be originated from a zinc stannate compound phase formed in the sintered body. Therefore, because film composition does not depend on film formation condition, and the sintered body has sufficient strength even in high charge power, the sintered body can be used in manufacturing with high yield.

Example 15

The oxide sintered body having the atomic number ratio, Sn/(Zn+Sn), of 0.25, and the atomic number ratio, Ti/(Zn+Sn+Ti), of 0.04 was prepared in the same way as in Example 1, except that $TiO_2$ powder with an average grain size of equal to or smaller than 1 μm was used as well as ZnO powder with an average grain size of equal to or smaller than 1 μm and SnO powder with an average grain size of equal to or smaller than 1 μm, as raw material powder. By evaluation of the oxide sintered body in the same way as in Example 1, it was found to be composed of the zinc oxide crystal phase of a wurtzite type structure dissolved with tin and titanium as solid solutions, and the zinc stannate phase, $Zn_2SnO_4$, described by the JCPDS card, No. 24-1470; however, a tin oxide phase such as $SnO_2$ or SnO or the like was not contained. Composition analysis of the resultant oxide sintered body, by ICP emission spectroscopy, showed that the composition was the same as feeding composition in formulation of raw material powder. Resistivity of the resultant oxide sintered body was 0.68 kΩcm.

Further, a sputtering target was prepared in the same way as in Example 1, using the resultant oxide sintered body, and a transparent conductive film was prepared in the same way as in Examples 1 to 7.

Resistivity of the resultant transparent conductive was found to be equal to or lower than $7.3 \times 10^{-1}$ Ωcm, and transmittance in the visible light range was equal to or higher than 85%, thus proving that the film was a good low resistant transparent conductive film. In addition, the resulting film was immersed into an aqueous solution of 3% KOH (30° C.) for about 10 minutes, and found that the film quality was not changed and thus found to be excellent in alkali resistance.

In addition, within a variation range of charge power to the target, 50 W to 600 W, (a DC charge power per unit surface area of the target surface of 0.276 to 3.308 $W/cm^2$), discharging was stable. In addition, composition of the film was analyzed using an ICP emission spectroscopy, and found to be nearly the same as the target composition. Film composition did not depend on charge power and was also not different by each film formation. In addition, the oxide sintered body of the present invention is capable of stably discharging without arc generation, even under charging of 1 kW (a DC charge power density of 5.513 $W/cm^2$). In addition, it was also confirmed that the target showed no crack or breakage, and the sintered body had sufficient strength. Strength of this oxide sintered body is considered to be originated from a zinc stannate compound phase formed in the sintered body. Therefore, because film composition does not depend on film formation condition, and the sintered body has sufficient strength even in high charge power, the sintered body can be used in manufacturing with high yield.

Example 16

The oxide sintered body having the atomic number ratio, Sn/(Zn+Sn), of 0.25, and the atomic number ratio, Ta/(Zn++

Ta), of 0.04 was prepared in the same way as in Example 1, except that $Ta_2O_5$ powder with an average grain size of equal to or smaller than 1 μm was used as well as ZnO powder with an average grain size of equal to or smaller than 1 μm and $SnO_2$ powder with an average grain size of equal to or smaller than 1 μm, as raw material powder. By evaluation of the oxide sintered body in the same way as in Example 1, it was found to be composed of the zinc oxide crystal phase of a wurtzite type structure dissolved with tin and tantalum, as solid solutions, and the zinc stannate phase, $Zn_2SnO_4$, described by the JCPDS card, no. 24-1470; however, a tin oxide phase such as $SnO_2$ or SnO or the like was not contained. Composition analysis of the resultant oxide sintered body, by ICP emission spectroscopy, showed that the composition was the same as feeding composition in formulation of raw material powder. Resistivity of the resultant oxide sintered body was 0.65 kΩcm.

Further, a sputtering target was prepared in the same way as in Example 1, using the resultant oxide sintered body, and a transparent conductive film was prepared in the same way as in Examples 1 to 7.

Resistivity of the resultant transparent conductive was found to be equal to or lower than $7.6 \times 10^{-1}$ Ωcm, and transmittance in the visible light range was equal to or higher than 85%, thus proving that the film was a good low resistant transparent conductive film. In addition, the resulting film was immersed into an aqueous solution of 3% KOH (30° C.) for about 10 minutes, and found that the film quality was not changed and thus found to be excellent in alkali resistance.

In addition, within a variation range of charge power to the target, 50 W to 600 W, (a DC charge power per unit surface area of the target surface of 0.276 to 3.308 $W/cm^2$), discharging was stable. In addition, composition of the film was analyzed using an ICP emission spectroscopy, and found to be nearly the same as the target composition. Film composition did not depend on charge power and was also not different by each film formation.

In addition, the oxide sintered body of the present invention is capable of stably discharging without arc generation, even under charging of 1 kW (a DC charge power density of 5.513 $W/cm^2$). In addition, it was also confirmed that the target showed no crack or breakage, and the sintered body had sufficient strength. Strength of this oxide sintered body is considered to be originated from a zinc stannate compound phase formed in the sintered body. Therefore, because film composition does not depend on film formation condition, and the sintered body has sufficient strength even in high charge power, the sintered body can be used in manufacturing with high yield.

Example 17

The oxide sintered body having the atomic number ratio, Sn/(Zn+Sn), of 0.25, and the atomic number ratio, W/(Zn+Sn+W), of 0.04 was prepared in the same way as in Example 1, except that $WO_3$ powder with an average grain size of equal to or smaller than 1 μm was used as well as ZnO powder with an average grain size of equal to or smaller than 1 μm and $SnO_2$ powder with an average grain size of equal to or smaller than 1 μm, as raw material powder. By evaluation of the oxide sintered body in the same way as in Example 1, it was found to be composed of the zinc oxide crystal phase of a wurtzite type structure dissolved with tin and tungsten, as solid solutions, and the zinc stannate phase, $Zn_2SnO_4$, described by the JCPDS card, No. 24-1470; however, a tin oxide phase such as $SnO_2$ or SnO or the like was not contained. Composition analysis of the resultant oxide sintered body, by ICP emission spectroscopy, showed that the composition was the same as feeding composition in formulation of raw material powder. Resistivity of the resultant oxide sintered body was 0.12 kΩcm.

Further, a sputtering target was prepared in the same way as in Example 1, using the resultant oxide sintered body, and a transparent conductive film was prepared in the same way as in Examples 1 to 7.

Resistivity of the resultant transparent conductive was found to be equal to or lower than $4.2 \times 10^{-1}$ Ωcm, and transmittance in the visible light range was equal to or higher than 85%, thus proving that the film was a good low resistant transparent conductive film. In addition, the resulting film was immersed into an aqueous solution of 3% KOH (30° C.) for about 10 minutes, and found that the film quality was not changed and thus found to be excellent in alkali resistance.

In addition, within a variation range of charge power to the target, 50 W to 600 W, (a DC charge power per unit surface area of the target surface of 0.276 to 3.308 $W/cm^2$), discharging was stable. In addition, composition of the film was analyzed using an ICP emission spectroscopy, and found to be nearly the same as the target composition. Film composition did not depend on charge power and was also not different by each film formation.

In addition, the oxide sintered body of the present invention is capable of stably discharging without arc generation, even under charging of 1 kW (a DC charge power density of 5.513 $W/cm^2$). In addition, it was also confirmed that the target showed no crack or breakage, and the sintered body had sufficient strength. Strength of this oxide sintered body is considered to be originated from a zinc stannate compound phase formed in the sintered body. Therefore, because film composition does not depend on film formation condition, and the sintered body has sufficient strength even in high charge power, the sintered body can be used in manufacturing with high yield.

Example 18

The oxide sintered body having the atomic number ratio, Sn/(Zn+Sn), of 0.25, and the atomic number ratio, Mo/(Zn+Sn+Mo), of 0.04 was prepared in the same way as in Example 1, except that $MoO_3$ powder with an average grain size of equal to or smaller than 1 μm was used as well as ZnO powder with an average grain size of equal to or smaller than 1 μm and SnO powder with an average grain size of equal to or smaller than 1 μm, as raw material powder. By evaluation of the oxide sintered body in the same way as in Example 1, it was found to be composed of the zinc oxide crystal phase of a wurtzite type structure dissolved with tin and molybdenum, as solid solutions, and the zinc stannate phase, $Zn_2SnO_4$, described by the JCPDS card, No. 24-4470; however, a tin oxide phase such as $SnO_2$ or SnO or the like was not contained. Composition analysis of the resultant oxide sintered body, by ICP emission spectroscopy, showed that the composition was the same as feeding composition in formulation of raw material powder. Resistivity of the resultant oxide sintered body was 0.15 kΩcm.

Further, a sputtering target was prepared in the same way as in Example 1, using the resultant oxide sintered body, and a transparent conductive film was prepared in the same way as in Examples 1 to 7.

Resistivity of the resultant transparent conductive was found to be equal to or lower than $3.5 \times 10^{-1}$ Ωcm, and transmittance in the visible light range was equal to or higher than 85%, thus proving that the film was a good low resistant transparent conductive film. In addition, the resulting film was immersed into an aqueous solution of 3% KOH (30° C.) for about 10 minutes, and found that the film quality was not changed and thus found to be excellent in alkali resistance.

In addition, within a variation range of charge power to the target, 50 W to 600 W, (a DC charge power per unit surface area of the target surface of 0.276 to 3.308 W/cm$^2$), discharging was stable. In addition, composition of the film was analyzed using an ICP emission spectroscopy, and found to be nearly the same as the target composition. Film composition did not depend on charge power and was also not different by each film formation.

In addition, the oxide sintered body of the present invention is capable of stably discharging without arc generation, even under charging of 1 kW (a DC charge power density of 5.513 W/cm$^2$). In addition, it was also confirmed that the target showed no crack or breakage, and the sintered body had sufficient strength. Strength of this oxide sintered body is considered to be originated from a zinc stannate compound phase formed in the sintered body. Therefore, because film composition does not depend on film formation condition, and the sintered body has sufficient strength even in high charge power, the sintered body can be used in manufacturing with high yield.

Examples 19 to 22

Then the oxide sintered body-containing zinc and tin, of the present invention, prepared in Example 1 and Examples 8 to 18 were heated under vacuum to be subjected to a reduction processing so as to control resistivity. In the case where annealing processing temperature was set at 700° C. and annealing time to be 10 hours, decrease in resistivity of the oxide sintered body was observed as follows: down to 57 Ωcm in the oxide sintered body of Example 1 (Example 19); down to $2.4\times10^{-1}$ Ωcm in the oxide sintered body of Example 8 (Example 20); down to $8.9\times10^{-1}$ Ωcm in the oxide sintered body of Example 9 (Example 21); and down to $7.8\times10^{-2}$ Ωcm in the oxide sintered body of Example 10 (Example 22). Composition analysis of all the resultant oxide sintered bodies after the reduction processing, by ICP emission spectroscopy, showed that the composition was the same as feeding composition in formulation of raw material powder. Powder X-ray diffraction measurement and local composition analysis by EPMA on all the oxide sintered bodies after the reduction processing showed that kinds of the configuring crystal phases were the same as those before the reduction processing, and all the oxide sintered bodies did not contain the SnO crystal phase or SnO$_2$ crystal phase.

Then, a target was mounted at the cathode for a non-magnetic body target of a DC magnetron sputtering apparatus equipped with a DC power source without arcing control function; and a glass substrate was arranged at an opposing position of the target. A part of just above the center of the sputtering target on the glass substrate was marked with a felt pen; then, target-substrate distance was set to 60 mm; the substrate was mounted, without heating, at the standing still, opposing position to the sputtering target. After purging target-substrate space down to equal to or less than $1\times10^{-4}$ Pa, gas pressure was adjusted to 0.5 Pa by introduction of pure argon gas mixed with 0.1 to 10% of oxygen gas; 200 W DC was charged to generate DC plasma and form a film onto the substrate by sputtering for 30 minutes. After the film formation, the felt pen mark and the film deposited thereon were removed with acetone to measure generated step difference, namely film thickness, using a surface roughness meter. Surface resistance of the film was measured by a four-pin probe method, and resistivity was calculated by multiplying surface resistance and film thickness. Resistivity of the film depended on oxygen amount introduced during sputtering, and film formation speed was calculated by film thickness/film formation time. Comparison of the film formation speed at the oxygen introduction amount providing lowest resistivity showed that use of the oxide sintered bodies of Examples 19 to 22, which were subjected to the reduction processing, attained 1.2 to 1.4 times higher-speed film formation than the cases using the targets of Example 1, and Examples 8 to 18. In addition, minimal resistivity of the resultant film was confirmed to lower by about 15% by the reduction processing of the oxide sintered body, and thus improved conductivity.

Similar tendency was observed also for the oxide sintered bodies of Examples 11 to 18, and execution of the reduction processing under similar condition as in Examples 19 to 22 was capable of lowering resistivity of the oxide sintered bodies and increasing film formation speed.

Comparative Example 11

The oxide sintered body was prepared in the same way as in Examples 1 to 7, except that the atomic number ratio, Sn/(Zn+Sn), was set to be 0.03. The resultant oxide sintered body was subjected to X-ray diffraction measurement, and local composition analysis by EPMA; the oxide sintered body was found to be composed of the zinc oxide crystal phase of a wurtzite type structure dissolved with tin, as a solid solution. A target was prepared in the same way as in Examples 1 to 7, using the resultant oxide sintered body, and a transparent conductive film was prepared by similar procedure as in Examples 1 to 7. The resulting film, by immersion into an aqueous solution of 1% KOH (30° C.) for about 10 minutes, became turbid and thus found to be inferior in alkali resistance, different from the resultant transparent conductive film from the oxide sintered body of the present invention.

Comparative Example 12

The oxide sintered body was prepared in the same way as in Examples 1 to 7, except that the atomic number ratio, Sn/(Zn+Sn), was set to be 0.55. The resultant oxide sintered body was subjected to X-ray diffraction measurement, and local composition analysis by EPMA; diffraction peaks originated from the zinc stannate phase, ZnSnO$_3$, described by the JCPDS card, No. 52-1381 as well as tin oxide, SnO$_2$ were observed. Resistivity was calculated by measurement of surface resistance of the resultant oxide sintered body on the sputter surface by a four-pin probe method and found to be 4.9 kΩcm. Further, a target was prepared in the same way as in Examples 1 to 7, using the resultant oxide sintered body, and a transparent conductive film was prepared by similar procedure as in Examples 1 to 7. In addition, within a variation range of charge power to the target, 50 W to 600 W, (a DC charge power per unit surface area of the target surface of 0.276 to 3.303 W/cm$^2$), discharging became unstable at 350 W (a DC charge power per unit surface area of the target surface of 1.930 W/cm$^2$) or higher by generation of arcing.

Such an oxide sintered body like this cannot be utilized for a mass manufacturing process requiring high productivity.

Comparative Example 13

The oxide sintered body having the atomic number ratio, Sn/(Zn+Sn), of 0.25 was prepared in the same way as in Examples 1 to 7, except that cooling was executed after sintering while introducing oxygen, in the manufacturing step of the oxide sintered body of Example 1. The resultant oxide sintered body was subjected to X-ray diffraction measurement, and local composition analysis by EPMA; diffraction peaks originated from the zinc oxide crystal phase of a wurtzite type structure dissolved with tin, as a solid solution, and the zinc stannate phase, $Zn_2SnO_4$, described by the JCPDS card, No. 24-1470 were observed; however, a diffraction peak originated from a tin oxide phase such as $SnO_2$ or SnO or the like was not observed. Resistivity was calculated by measurement of surface resistance of the resultant oxide sintered body on the sputter surface by a four-pin probe method and found to be 5.8 kΩcm. Further, a target was prepared in the same way as in Examples 1 to 7, using the resultant oxide sintered body, and a transparent conductive film was prepared by similar procedure as in Examples 1 to 7. In addition, within a variation range of charge power to the target, 50 W to 600 W, (a DC charge power per unit surface area of the target surface of 0.276 to 3.308 W/cm$^2$), discharging became unstable at 500 W (a DC charge power per unit surface area of the target surface of 2.757 W/cm$^2$) or higher by generation of arcing; it is considered to be caused by that resistivity of the oxide sintered body was as high as 5.8 kΩcm and thus all the target surface was charged in the case where a DC power of 500 W or higher was charged.

Such an oxide sintered body like this cannot be utilized for a mass manufacturing process requiring high productivity.

Comparative Example 14

An oxide film containing tin and zinc was formed under similar condition as in Example 1, except that a Zn—Sn-based alloy target was used. Four kinds of the alloy targets were used, each of which had the same composition as each of the atomic number ratios, Sn/(Zn+Sn), in Examples 1, 8, 9 and 10, respectively. Resistivity of the film depended on oxygen amount introduced during sputtering, and optimal oxygen amount providing lowest resistivity was determined. Dependence of resistivity on oxygen amount was extremely larger as compared with using the oxide targets of Examples 1, 8, 9 and 10.

In addition, within a variation range of charge power to the target, 50 W to 600 W, (a DC charge power per unit surface area of the target surface of 0.276 to 3.308 W/cm$^2$), discharging was stable. In addition, composition of the film obtained under the optimal oxygen amount was analyzed by ICP emission spectroscopy; tin content was found to be higher by about 10 to 40% than in target composition. Film composition largely depended on charge power, and higher charge power provided larger difference in film composition from target composition. In addition, in repeated film formation under the same film formation condition, the optimal oxygen amount fluctuated by each of the film formations, and also variation of film composition was significant; with the variation of film composition, variation of conductivity or transmittance of the film was also large. Such a Zn—Sn-based alloy target like this cannot be utilized in manufacturing requiring high yield, due to more likely variation of the composition and characteristics of the film.

Example 23

The oxide sintered bodies of Example 1, Examples 8 to 22, and Comparative Examples 1 to 13 were applied to tablets for ion plating. The results showed similar tendency as each of the above Example and Comparative Examples; namely, inclusion of the tin oxide crystal phase in the oxide sintered body inhibited stable film formation; in addition, lower resistivity of the oxide sintered body provided higher film formation speed, in particular, the case of 5 kΩcm or lower was capable of attaining high power charging and high-speed film formation.

What is claimed is:

1. An oxide sintered body consisting essentially of zinc, tin and oxygen, characterized by containing tin at an atomic number ratio, Sn/(Zn+Sn), of 0.23 to 0.50, and wherein the oxide sintered body contains a zinc stannate compound,
wherein the zinc stannate compound includes at least one selected from the group consisting of $Zn_2SnO_4$ having a tin element as solid solution at the Zn site thereof, and $Zn_2SnO_4$ with a non-stoichiometric composition having a ratio of Sn/(Zn+Sn) that is a little deviated from that of $Zn_2SnO_4$, and
wherein the oxide sintered body does not contain a detectable amount, by EPMA analysis, of a tin oxide crystal phase or a tin oxide crystal phase having zinc as a solid solution.

* * * * *